(12) United States Patent
Hui

(10) Patent No.: US 7,388,935 B2
(45) Date of Patent: Jun. 17, 2008

(54) METHOD OF INVERTING NEARLY TOEPLITZ OR BLOCK TOEPLITZ MATRICES

(75) Inventor: Dennis Hui, Cary, NC (US)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 774 days.

(21) Appl. No.: 10/868,091

(22) Filed: Jun. 15, 2004

(65) Prior Publication Data

US 2005/0276356 A1     Dec. 15, 2005

(51) Int. Cl.
*H03D 1/00* (2006.01)
(52) U.S. Cl. .................. 375/340; 375/229; 375/346; 375/348; 375/316; 375/285
(58) Field of Classification Search ........... 375/340, 375/229, 346, 348, 316, 285
See application file for complete search history.

(56) References Cited

U.S. PATENT DOCUMENTS

| | | | | |
|---|---|---|---|---|
| 5,761,088 A * | 6/1998 | Hulyalkar et al. | ......... | 348/614 |
| 6,690,660 B2 * | 2/2004 | Kim et al. | ......... | 370/335 |
| 6,775,322 B1 * | 8/2004 | Zangi et al. | ......... | 375/232 |
| 7,042,967 B2 * | 5/2006 | Reznik et al. | ......... | 375/346 |
| 7,046,740 B2 * | 5/2006 | Dowling | ......... | 375/296 |

FOREIGN PATENT DOCUMENTS

WO    WO 02/15505 A2    2/2002

OTHER PUBLICATIONS

Merchant, "Efficient solution of a Toeplitz-plus-Hankel coefficient matrix system of equations", IEEE Transactions on Acoustics, Speech, and Signal Processing, vol. 30, Issue 1, Feb. 1982 pp. 40-44.*

Yagle, "A new multichannel split Levinson algorithm for block Hermitian-Toeplitz matrices", IEEE Transactions on Circuits and Systems, vol. 36, Issue 6, Jun. 1989 pp. 928-931.*

S. N. Crozier, et al., "Least sum of squared errors (LSSE) channel estimation", IEEE Proceedings-F, vol. 138, No. 4, Aug. 1991.

Gilbert Strang, "A Proposal for Toeplitz Matrix Calculations", Studies in Applied Mathematics 74:171-176 (1986), Elsevier Science Publishing Co., Inc.

(Continued)

*Primary Examiner*—Mohammed Ghayour
*Assistant Examiner*—Juan Alberto Torres

(57) ABSTRACT

A method of computing an inversion (X) of a nearly Toeplitz n by n matrix (A). A perturbation matrix (E) is first determined such that the sum of the nearly Toeplitz matrix (A) and the perturbation matrix (E) is a Toeplitz matrix (T). The inversion is solved by solving the equation $X=T^{-1}(B+EX)$, where B is a vector or matrix of dimension n by m. An initial estimate $X^{(0)}$ is selected and estimates of the inversion X are iteratively computed through the recursion $X^{(n-1)}=T^{-1}(B+EX^{(n)})$. The initial estimate $X^{(0)}$ may be equal to an inversion ($T^{-1}$) of the Toeplitz matrix (T). The present invention may be utilized in a radio receiver to efficiently compute (1) a least-squares (LS) channel estimate, (2) minimum mean squared error (MMSE) prefilter coefficients for a decision feedback equalizer (DFE), or (3) an autoregressive (AR) noise-spectrum estimation from a finite number of observed noise samples.

16 Claims, 6 Drawing Sheets

OTHER PUBLICATIONS

B. Friedlander, et al., New Inversion Formulas for Matrices Classified in Terms of Their Distance from Toeplitz Matrices:, Linear Algebra and its Applications 27:31-60 (1979) Elsevier North Holland, Inc.

Hirotugu Akaike, "Block Toeplitz Matrix Inversion", SIAM J. Appl. Math., vol. 24, No. 2, Mar. 1973.

Wiliam F. Trench, "An Algorithm for the Inversion of Finite Toeplitz Matrices", Journal of the Society for Industrial and Applied Mathematics, vol. 12, No. 3 (Sep. 1976), 515-522.

* cited by examiner

METHOD OF INVERTING NEARLY TOEPLITZ OR BLOCK TOEPLITZ MATRICES

BACKGROUND OF THE INVENTION

The present invention relates generally to radio telecommunication networks. More particularly, and not by way of limitation, the present invention is directed to an efficient method of inverting nearly Toeplitz or block Toeplitz matrices in adaptive wireless receivers.

The ability to adapt to different propagation and interference conditions is highly important in modern wireless receivers. In a typical adaptive receiver, various parameters that characterize the current communication link conditions, such as channel response and interference statistics, are often estimated over a limited number of received signal samples. The core of such estimation processes often requires the inversion of matrices that have approximately Toeplitz or block Toeplitz forms. A Toeplitz matrix is any n×n matrix with values constant along each top-left-to-lower-right diagonal. More precisely, if T is a Toeplitz matrix, then the element in the i-th row and the j-th column, for any i and j, can be expressed as $[T_{ij}]=a(i-j)$ for some scalar function, $a(k)$, where k is an integer, as shown below:

$$T = \begin{bmatrix} a(0) & a(-1) & \ldots & a(-(n-2)) & a(-(n-1)) \\ a(1) & a(0) & a(-1) & \vdots & a(-(n-2)) \\ \vdots & a(1) & a(0) & a(-1) & \vdots \\ a(n-2) & \vdots & a(1) & a(0) & a(-1) \\ a(n-1) & a(n-2) & \ldots & a(1) & a(0) \end{bmatrix}$$

A block Toeplitz matrix is defined in the same manner except that $a(k)$ is a p×p matrix function where n is divisible by the integer p.

An exemplary use of nearly Toeplitz or block Toeplitz matrices is found in equalizers that address the problem of multipath fading of wireless channels. Multipath fading is a key phenomenon that makes reliable transmission difficult in a wireless communication system, and is typically caused by reflections of the transmitted radio signal from numerous local scattering objects situated around the receiver. Not only is such multi-path fading time-varying, but it also causes intersymbol interference (ISI) at the receiver. To mitigate the detrimental effect of ISI, a wireless receiver typically uses an equalizer. One of the best and most popular equalization method is the maximum-likelihood sequence estimation (MLSE). To operate properly, an MLSE equalizer requires an accurate estimate of the wireless channel. Because of the time-varying nature of the fading channel, the channel estimate often needs to be updated periodically. The least-squares (LS) method is one of the most commonly used methods of channel estimation. To compute an LS channel estimate, it is known that the inversion of so-called Fisher information, which is a matrix that is nearly, but not exactly Toeplitz, is required. (See, Crozier, S. N. et. al., "Least sum of squared errors (LSSE) channel estimation," *IEEE Proceedings-F* 1991, pp. 371-378, which is hereby incorporated by reference.)

Although an MLSE equalizer can provide excellent performance in terms of reducing the overall bit error rates, its complexity of implementation grows exponentially with the length of the channel estimate. Consequently, in situations where the channel response is relatively long, a reduced complexity equalizer, such as the decision-feedback equalizer (DFE) is often used instead. A DFE equalizer demodulates the transmitted symbols sequentially one after another and uses the demodulated symbols of previous time instants to estimate the effect of ISI that these previous symbols cause at the next time instant. In order to improve the estimate of ISI, a prefilter is often used before a DFE equalizer to transform the effective channel response so that most of the energy of the resulting channel response, after prefiltering, is concentrated in the front-most channel tap. Since the original channel response may vary with time, the prefilter also needs to be computed periodically. One of the most commonly used prefilters is the minimum-mean-squared-error (MMSE) prefilter. To compute an MMSE prefilter, the receiver needs to invert a nearly Toeplitz matrix that depends on the channel response as well as the variance of noise in the received signal. (See, Proakis, John G., *Digital Communications*, $2^{nd}$ edition, McGraw-Hill, 1989, which is hereby incorporated by reference.)

For yet another example, consider a high-capacity cellular communication network where radio frequencies are being reused in different geographical areas within close proximity. In such a network, mutual interference among users occupying the same radio channel is often a major source of signal disturbance. Thus, mobile receivers that are capable of suppressing interference are highly desirable. A simple and effective method of suppressing interference is to model the interference as colored noise and to attempt to whiten the noise using a linear predictive filter, commonly referred to as a whitening filter. The whitening filter flattens the frequency spectrum of the noise (or "whitens" the noise) by subtracting from it the portion that is predictable using estimates of noise samples from previous time instants. Through this whitening process, the noise power is reduced. Since the spectrum of the interference typically varies with time, the receiver often needs to adaptively compute such a whitening filter based on the received signal. A popular and effective method of computing this whitening filter, or equivalently of estimating the interference spectrum, is the covariance method. (See, Kay, S. M., *Modern Spectral Estimation, Theroy & Application*, Prentice-Hall, 1988, which is hereby incorporated by reference.) The covariance method requires the calculation of the inverse of a noise covariance matrix that is nearly, but not exactly Toeplitz. This covariance matrix becomes a block Toeplitz matrix when the received signal consists of multiple branches, which may come from multiple antennas or oversampling of the received signal.

As can be seen from the above examples, in channel estimation processes, these matrices are typically not known a priori, and since they need to be inverted in real time, efficient techniques for inverting nearly Toeplitz matrices are highly desirable. While efficient algorithms exist for inverting Toeplitz and block Toeplitz matrices, relatively little is known about inverting nearly Toeplitz matrices. Typically, nearly Toeplitz matrices have been inverted using techniques for solving linear equations such as the Gaussian elimination, Cholesky decomposition, and the Gauss-Seidel algorithm. However, these techniques do not exploit the nearly Toeplitz structure, and thus tend to be too complex to implement efficiently. In Friedlander, B., et al., "New Inversion Formulas for Matrices Classified in Terms of Their Distance From Toeplitz Matrices," *Linear Algebra and its Applications*, Vol. 27, pp. 31-60, 1979, an algorithm was proposed for inverting a class of nearly Toeplitz matrices based on the notion of displacement rank. This algorithm is quite complex to implement and provides computational benefits only for those matrices with low displacement ranks. In co-owned PCT application WO 02/15505, an algorithm is proposed for inverting a specific form of nearly Toeplitz matrix of the form, $(C^H C+\sigma^2 I)$, where C is an $L_f \times L_f$ truncated convolutional matrix of the channel response. However, the algorithm proposed in WO 02/15505 is also complex and only works for matrices in this specific form, but not for other nearly Toeplitz matrices in general.

BRIEF SUMMARY OF THE INVENTION

In one aspect, the present invention is directed to a simple and effective method of computing an inversion (X) of a nearly Toeplitz n by n matrix (A), the inversion (X) being a matrix of dimensions n by m. The method includes determining a perturbation matrix (E) such that the sum of the nearly Toeplitz matrix (A) and the perturbation matrix (E) is a Toeplitz matrix (T). The inversion is then solved for by solving the equation $X=T^{-1}(B+EX)$, where B is a vector or matrix of dimension n by m. The solving step includes the steps of selecting an initial estimate $X^{(0)}$; and iteratively computing estimates of the inversion X through the recursion $X^{(n+1)}=T^{-1}(B+EX^{(n)})$.

In specific embodiments, the present invention may be utilized in a radio receiver to efficiently compute (1) a least-squares (LS) channel estimate, (2) minimum mean squared error (MMSE) prefilter coefficients for a decision feedback equalizer (DFE), or (3) an autoregressive (AR) noise-spectrum estimation from a finite number of observed noise samples.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION OF THE INVENTION

This disclosure describes an iterative algorithm for inverting nearly Toeplitz matrices that can be utilized, for example, in many areas of baseband receiver algorithms. In summary, the invention addresses the problem of solving $$AX=B \qquad (1)$$

where A is an n by n invertible, nearly Toeplitz (or block Toeplitz) matrix, B is a vector or matrix of dimension n by m, and X is the desired inverse or solution of dimensions n by m.

Figure 1:
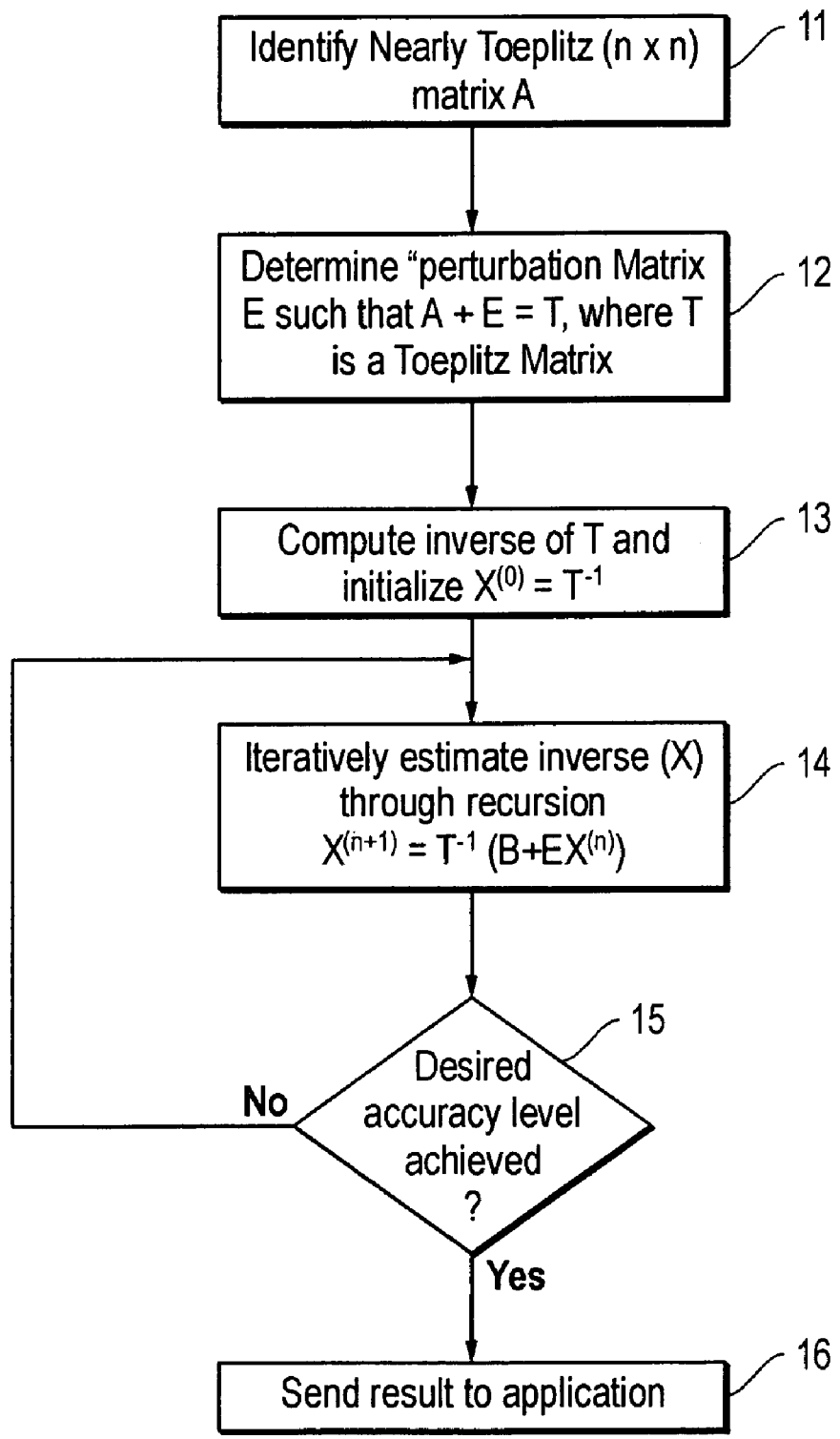
FIG. 1 is a flow chart illustrating the steps of an exemplary embodiment of the method of the present invention.

FIG. 1 is a flow chart illustrating the steps of an exemplary embodiment of the method of the present invention. The method starts at step 11 by identifying a nearly Toeplitz (or block Toeplitz) n by n matrix A. At step 12, a "perturbation" matrix E is determined such that A+E=T, where T is a Toeplitz (or block Toeplitz) matrix. At step 13, the inverse matrix of T is computed using known efficient algorithms for inverting Toeplitz or block Toeplitz matrix. If A is nearly Toeplitz or block Toeplitz, then E is "small" in some sense (for example, its $L_2$ norm is small). It follows that equation (1) can be written as $$X=T^{-1}(B+EX) \qquad (2)$$

At step 14, the fixed point equation (2) is solved by iteratively computing estimates of the actual inverse X through the recursion $$X^{(n+1)}=T^{-1}(B+EX^{(n)}) \qquad (3)$$

starting with an arbitrary initial estimate $X^{(0)}$. For example, $X^{(0)}$ may be set equal to the inversion of the Toeplitz matrix ($T^{-1}$). If T is a Toeplitz matrix, $T^{-1}$ can be efficiently computed using known algorithms, such as the Trench or the Strang algorithm. The Trench algorithm is described in Trench, W. F., "An Algorithm for the Inversion of Finite Toeplitz Matrices", *J. SIAM* 12, pp. 515-522, September 1964. The Strang algorithm is described in Strang, G., "A Proposal for Toeplitz Matrix Calculations", *Stud. Apply Math.*, pp. 171-176, January 1976. If T is block Toeplitz, the Akaike algorithm, which is a generalization of the Trench algorithm to the block Toeplitz case, can be used. The Akaike algorithm is described in Akaike, H., "Block Toeplitz matrix inversion," *SIAM J. Appl. Math.*, vol. 24, pp. 234-241, March 1973. All of these references are incorporated herein by reference. The recursion in equation (3) is guaranteed to converge so long as the maximum eigenvalue of $T^{-1}E$ is less than one, which is the case when A is nearly Toeplitz.

At step 15, it is determined whether the desired level of accuracy for the inversion has been achieved. If not, the method returns to step 14 and performs another iteration. If the desired level of accuracy has been achieved, the method moves to step 16 where the result is sent to the appropriate application for further processing.

When utilized in a baseband receiver algorithm, the perturbation matrix can often be written in the form of $E=\epsilon^H \epsilon$, for a certain matrix $\epsilon$, which stems from truncated portions of the corresponding convolution matrix of each problem. As an illustrative example, consider the widely used least-squares (LS) channel estimate $\hat{c}$ over a sequence of known symbols $$\{s[n]\}_{k=0}^{N-1}$$

given by $$\hat{c}=(S^H S)^{-1} S^H r \qquad (4)$$

where r is a vector of received samples and S is a truncated convolution matrix of the transmitted symbols given by $$S \equiv \begin{bmatrix} s[L-1] & s[L-2] & \ldots & s[0] \\ s[L] & s[L-1] & \ldots & s[1] \\ \vdots & \vdots & \ldots & \vdots \\ s[N-1] & s[N-2] & \ldots & s[N-L] \end{bmatrix}. \quad (5)$$

Because of the truncated nature of S, the Fisher information matrix $S^H S$ that needs to be inverted in equation (4) is approximately, but not exactly, Toeplitz. When the transmitted symbols are known a priori, the inverse of $S^H S$ can be pre-computed to minimize the efforts needed to compute $\hat{c}$ in real time. However, in high-performance receivers, the received samples r may be filtered by a certain noise-whitening filter before channel estimation. In this case, the Fisher information matrix $S^H S$ is based on whitened symbols (i.e., transmitted symbols filtered by the same noise whitening filter), which are unknown a priori and therefore must be computed in real time.

For the LS channel estimation problem, the matrix $\epsilon$ is given by:

$$\varepsilon \equiv \begin{bmatrix} s[0] & 0 & \ldots & 0 \\ s[1] & s[0] & \ldots & 0 \\ \vdots & \vdots & \ldots & \vdots \\ s[L-2] & \ldots & s[0] & 0 \\ 0 & s[N-1] & \ldots & s[N-L+1] \\ \vdots & \vdots & \ldots & \vdots \\ 0 & \ldots & s[N-1] & s[N-2] \\ 0 & \ldots & 0 & s[N-1] \end{bmatrix}. \quad (6)$$

Figure 2:
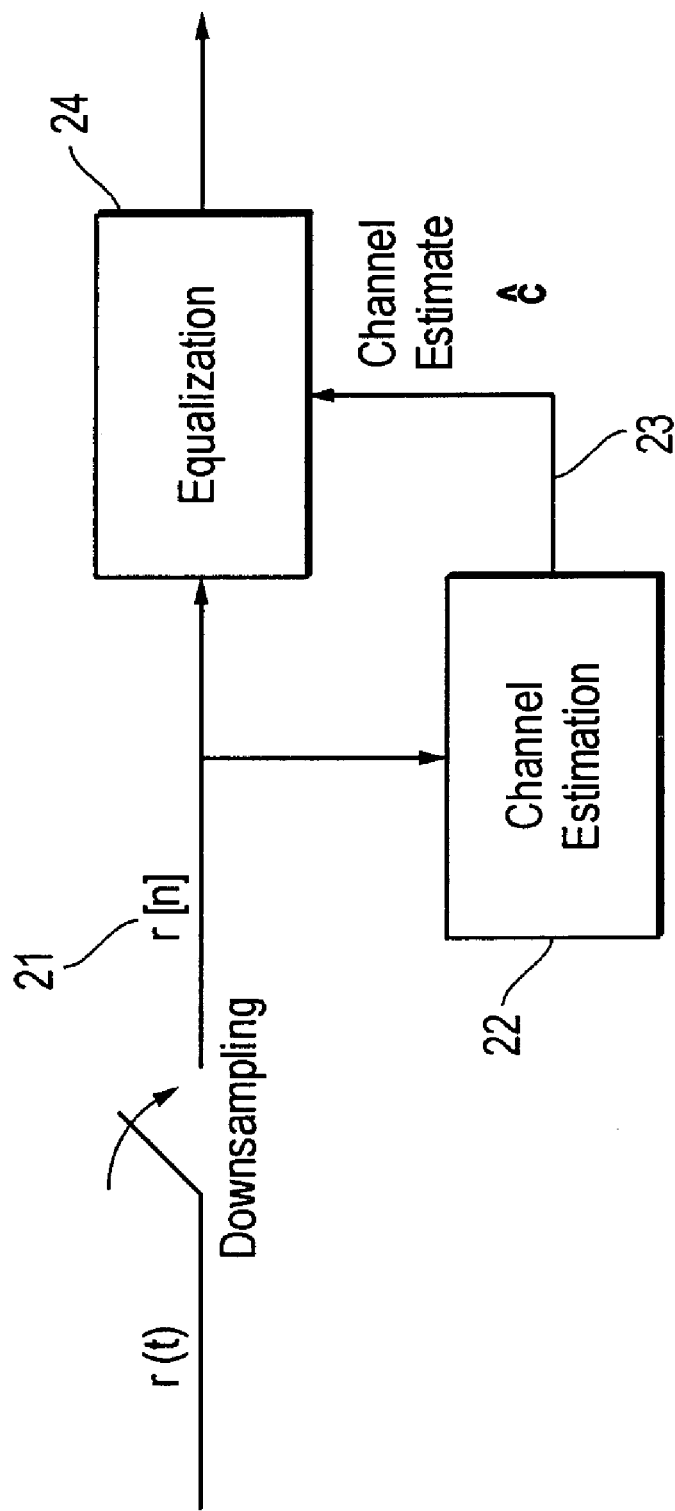
FIG. 2 is a simplified block diagram of a portion of an adaptive receiver illustrating where a least-squares channel estimate is performed in accordance with the teachings of the present invention.

FIG. 2 is a simplified block diagram of a portion of an adaptive receiver illustrating where a least-squares channel estimate is performed in accordance with the teachings of the present invention. Received and downsampled samples, r[n], 21 are input to a channel estimation function 22 where the process described above is utilized to determine the least-squares (LS) channel estimate (ĉ) 23. The received samples, r[n], and the channel estimate, ĉ, are then provided to an equalization function 24.

As another example, consider the computation of minimum mean squared error (MMSE) prefilter coefficients for a decision feedback equalizer (DFE). The vector of the MMSE prefilter coefficients of length $L_f$ denoted by f, is given by $$f = (C^H C + \sigma^2 I)^{-1} C^H e_{L_f} \quad (7)$$

where C is an $L_f \times L_f$ truncated convolutional matrix of the channel response given by $$C \equiv \begin{bmatrix} c[0] & 0 & \ldots & 0 & 0 & \ldots & 0 \\ c[1] & c[0] & \ldots & 0 & 0 & \ldots & 0 \\ c[2] & c[1] & c[0] & 0 & 0 & \ldots & 0 \\ \vdots & \vdots & \ldots & \vdots & & & \\ 0 & \ldots & 0 & c[L-1] & \ldots & c[1] & c[0] \end{bmatrix}. \quad (8)$$

$\{c[k]\}_{k=0}^{L-1}$ denotes an L-tap channel response, $\sigma$ denotes the variance of noise in the received signal, I is an $L_f \times L_f$ identity matrix, and $e_{L_f}$ is the last column of an $L_f \times L_f$ identity matrix. Note that the matrix $(C^H C + \sigma^2 I)$ is again, approximately Toeplitz.

For the MMSE prefilter problem, the matrix $\epsilon$ is given by:

$$\varepsilon \equiv \begin{bmatrix} 0 & c[L-1] & \ldots & c[1] \\ \vdots & \vdots & \ldots & \vdots \\ 0 & \ldots & c[L-1] & c[L-2] \\ 0 & \ldots & 0 & c[N-1] \end{bmatrix}. \quad (9)$$

Figure 3:
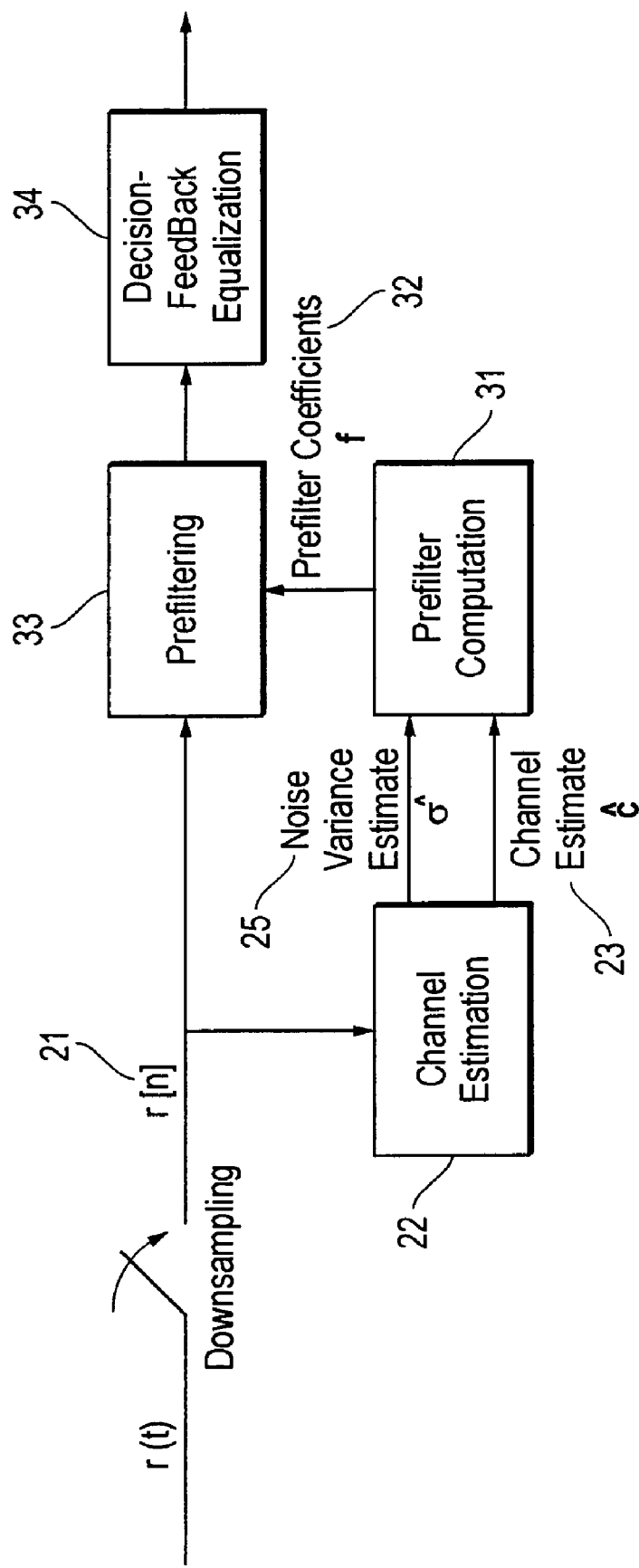
FIG. 3 is a simplified block diagram of a portion of an adaptive receiver illustrating where a channel estimation is used to calculate MMSE prefilter coefficients for use in a Decision Feedback Equalizer (DFE) in accordance with the teachings of the present invention.

FIG. 3 is a simplified block diagram of a portion of an adaptive receiver illustrating where a channel estimation is used to calculate MMSE prefilter coefficients for use in a Decision Feedback Equalizer (DFE) in accordance with the teachings of the present invention. Received and downsampled samples, r[n], 21 are input to a channel estimation function 22 where the process described above is utilized to determine the least-squares (LS) channel estimate (ĉ) 23 and a noise variance estimate (σ̂) 25. The channel estimate, ĉ, is then provided to a prefilter computation function 31 where the process described immediately above is utilized to determine prefilter coefficients (f) 32. The received samples, r[n], and the prefilter coefficients, f, are then provided to a prefiltering function 33. The results of the prefiltering are then provided to a DFE equalization function 34.

As a third example, consider the problem of autoregressive (AR) noise-spectrum estimation from a finite number of observed noise samples $\{y[n]\}_{n=0}^{N-1}$.

In typical adaptive receivers, these noise samples may represent the residual samples obtained by subtracting the hypothesized received samples constructed based on a channel estimate from the actual received samples. A common method of estimating the AR coefficients that most accurately fit the spectrum of $\{y[n]\}_{n=0}^{N-1}$ is the covariance method. In this method, the vector of AR coefficients, denoted by $a = (a_1, a_2, \ldots, a_M)$ is computed by:

$$a = \left( \sum_{n=M}^{N-1} y[n] y[n-1]^H \right) \underbrace{\left( \sum_{n=M}^{N-1} y[n-1] y[n-1]^H \right)^{-1}}_{M^{-1}}, \quad (10)$$

where $y[n] \equiv (y[n], y[n-1], \ldots, y[n-M+1])^T$. Similar to the previous two examples, the matrix M that needs to be inverted in this problem is again approximately, but not exactly, Toeplitz. (In the case for multiple-antenna receivers the matrix M is an almost block Toeplitz matrix.)

For the AR noise-spectrum estimation problem, the matrix $\epsilon$ is given by:

$$\varepsilon \equiv \begin{bmatrix} y[0] & 0 & \ldots & 0 \\ y[1] & y[0] & \ldots & 0 \\ \vdots & \vdots & \ldots & \vdots \\ y[M-2] & \ldots & y[0] & 0 \\ 0 & y[N-1] & \ldots & y[N-M+1] \\ \vdots & \vdots & \ldots & \vdots \\ 0 & \ldots & y[N-1] & y[N-2] \\ 0 & \ldots & 0 & y[N-1] \end{bmatrix} \quad (11)$$

Figure 4:
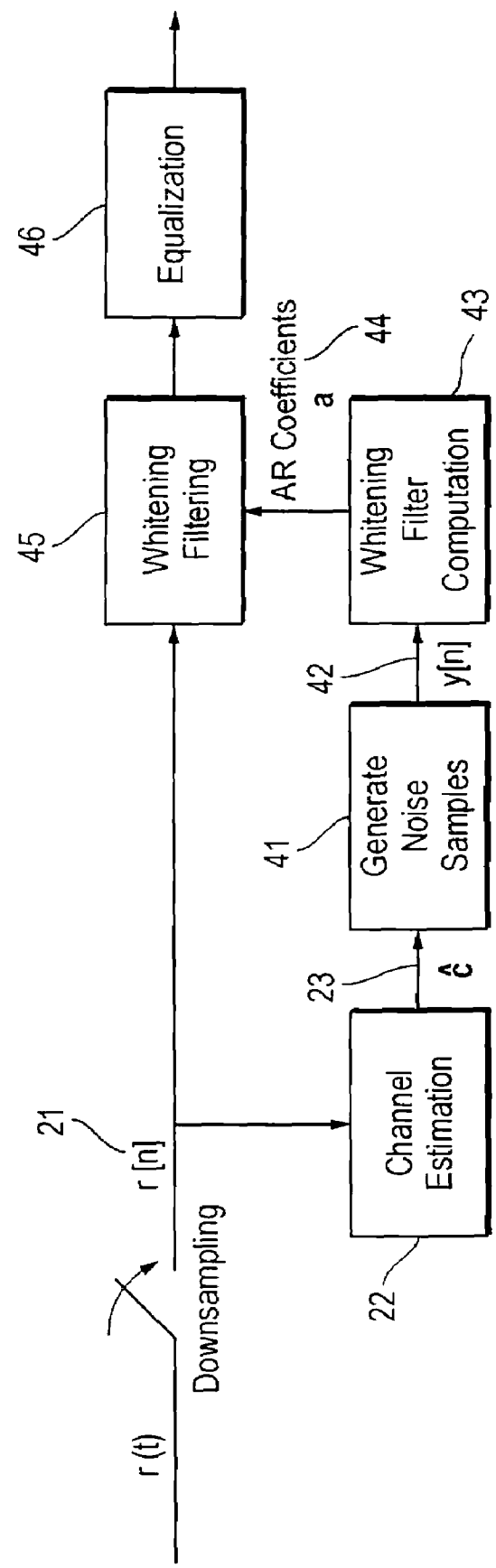
FIG. 4 is a simplified block diagram of a portion of an adaptive receiver illustrating where an autoregressive (AR) noise-spectrum estimation is determined in accordance with the teachings of the present invention.

FIG. 4 is a simplified block diagram of a portion of an adaptive receiver illustrating where an autoregressive (AR) noise-spectrum estimation is determined in accordance with the teachings of the present invention. Received and downsampled samples, r[n], 21 are input to a channel estimation function 22 where the process described above is utilized to determine the least-squares (LS) channel estimate (ĉ) 23. The channel estimate, ĉ, is then utilized in a noise generation function 41 to generate noise samples y[n] 42. The noise samples, y[n], are then utilized in a whitening filter computation function 43 to determine AR filter coefficients (a) 44. The received samples, r[n], and the AR filter coefficients, a, are then provided to a whitening filter 45. The results of the filtering are then provided to an equalization function 46.

Figure 5:
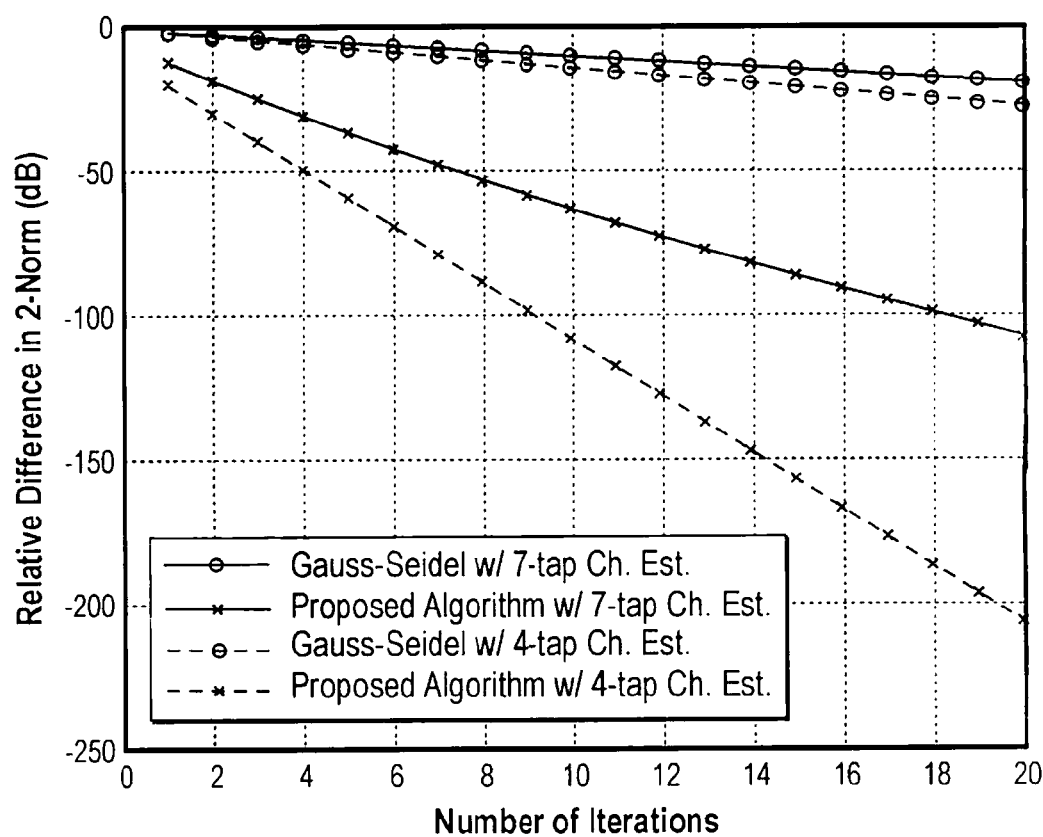
FIG. 5 is a graph of relative difference as a function of number of iterations of the algorithm of the present invention and the Gauss-Seidel algorithm.

The invention may be implemented, for example, in receivers utilized in the Global System for Mobile Communications (GSM) and Enhanced Data for GSM Evolution (EDGE) systems. For example, consider the LS channel estimate problem described above. The invention provides an efficient method to compute more reliable channel estimates using whitened received samples with whitened training sequences. FIG. 5 shows, after each iteration of the algorithm of the present invention, the accuracy of inverses of the Fisher matrices of whitened training sequences. The accuracy is measured by the percentage difference in Euclidean-norm, i.e.

$$\text{Error} = \frac{\|X^{(n)} - X\|}{\|X\|}. \quad (12)$$

Both cases of L=4 and L=7 are shown. For comparison, the accuracy of the inverse computed by the conventional Gauss-Seidel algorithm is also shown. As shown in FIG. 5, the algorithm of the present invention converges much faster than the Gauss-Seidel algorithm because the invention exploits the nearly Toeplitz structure of the Fisher matrices. Only two iterations in the 4-tap case and four iterations in the 7-tap case are needed to bring the error below 30 dB.

Figure 6:
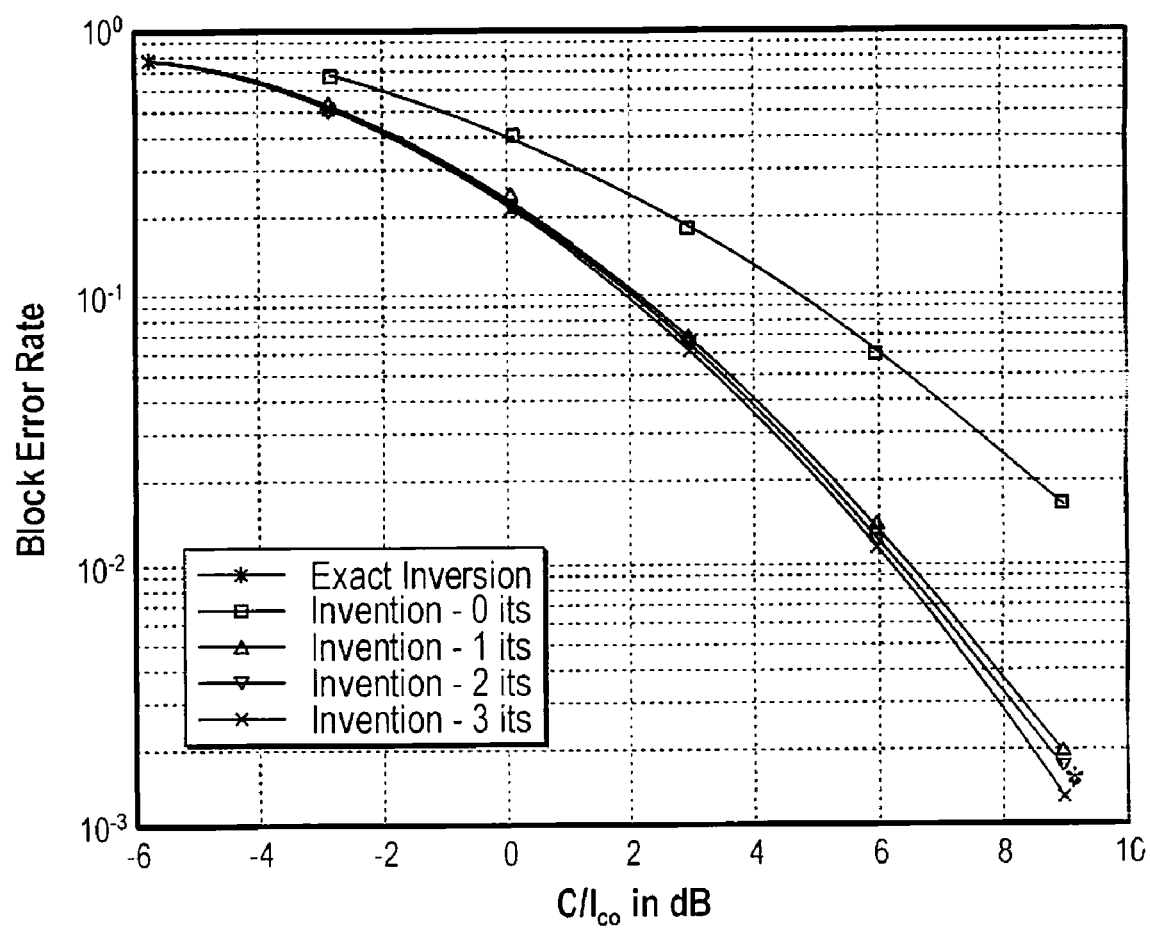
FIG. 6 is a graph of block error rate as a function of carrier-to-interference (C/I) ratio for a two-antenna receiver utilizing differing numbers of iterations of the algorithm of the present invention.

FIG. 6 shows the block error rate performance when the present invention is used to estimate the channel response after whitening filtering in a 2-antenna receiver. The 0-th iteration means that $T^{-1}$ is directly used as the inverse of the Fisher information matrix in equation (4). As shown in FIG. 6, only one or two iterations suffice to obtain the same performance as that provided by an exact inversion, because the invention exploits the nearly block Toeplitz structure of the underlying Fisher matrix.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of computing, in a baseband radio receiver, a least-squares (LS) channel estimate, ĉ, over a sequence of known transmitted symbols $$\{s[n]\}_{k=0}^{N-1}$$

given by the equation:

$$\hat{c} = (S^H S)^{-1} S^H r$$

where $S^H S$ is a Fisher information matrix, r is a vector of received samples, and S is a truncated convolution matrix of the transmitted symbols given by:

$$S \equiv \begin{bmatrix} s[L-1] & s[L-2] & \ldots & s[0] \\ s[L] & s[L-1] & \ldots & s[1] \\ \vdots & \vdots & \ldots & \vdots \\ s[N-1] & s[N-2] & \ldots & s[N-L] \end{bmatrix},$$

wherein the information matrix $S^H S$ is a nearly Toeplitz matrix based on whitened symbols that are unknown a priori and therefore must be computed in real time, said method comprising the steps of:

determining a perturbation matrix (E) in the form of $E = \epsilon^H \epsilon$, for a certain matrix, $\epsilon$, which stems from truncated portions of the convolution matrix (S) such that the sum of the nearly Toeplitz information matrix ($S^H S$) and the perturbation matrix (E) is a Toeplitz matrix (T);

solving for the inversion (X) of the nearly Toeplitz matrix ($S^H S$) by solving the equation:

$$X = T^{-1}(B + EX),$$

where B is a vector or matrix of dimension n by m, said solving step including the steps of:

selecting an initial estimate $X^{(0)}$;

iteratively computing estimates of the inversion X through the recursion:

$$X^{(n+1)} = T^{-1}(B + EX^{(n)});$$

and computing said least-squares channel estimate, ĉ, to equalize the received signal using X.

2. The method of claim 1, wherein the matrix $\epsilon$ is given by:

$$\varepsilon \equiv \begin{bmatrix} s[0] & 0 & \ldots & 0 \\ s[1] & s[0] & \ldots & 0 \\ \vdots & \vdots & \ldots & \vdots \\ s[L-2] & \ldots & s[0] & 0 \\ 0 & s[N-1] & \ldots & s[N-L+1] \\ \vdots & \vdots & \ldots & \vdots \\ 0 & \ldots & s[N-1] & s[N-2] \\ 0 & \ldots & 0 & s[N-1] \end{bmatrix}.$$

3. The method of claim 1, further comprising, after each iteration of the solving step, the steps of:
   determining whether a desired level of accuracy has been achieved for the inversion (X) of the nearly Toeplitz matrix ($S^H S$); and
   when the desired level of accuracy has not been achieved, performing another iteration of the solving step.

4. The method of claim 1, wherein the step of determining a perturbation matrix (E) includes determining the perturbation matrix (E) such that the maximum eigenvalue of $T^{-1}E$ is less than one, thereby guaranteeing that the recursion in the solving step converges.

5. A method of computing, in a baseband radio receiver, feedback equalizer (DFE), wherein a vector of the MMSE prefilter coefficients of length $L_f$, denoted by f, is given by:

$$f = (C^H C + \sigma^2 I)^{-1} C^H e_{L_f},$$

where C is an $L_f \times L_f$ truncated convolutional matrix of the channel response given by:

$$C \equiv \begin{bmatrix} c[0] & 0 & \ldots & 0 & 0 & \ldots & 0 \\ c[1] & c[0] & \ldots & 0 & 0 & \ldots & 0 \\ c[2] & c[1] & c[0] & 0 & 0 & \ldots & 0 \\ \vdots & \vdots & \ldots & \vdots & & & \\ 0 & \ldots & 0 & c[L-1] & \ldots & c[1] & c[0] \end{bmatrix},$$

and where ($C^H C + \sigma^2 I$) is a nearly Toeplitz n by n matrix, and $e_{L_f}$ is the last column of an $L_f \times L_f$ identity matrix, said method comprising the steps of:
   determining a perturbation matrix (E) in the form of $E = \epsilon^H \epsilon$, for a certain matrix, $\epsilon$, which stems from truncated portions of the convolution matrix (C) such that the sum of the nearly Toeplitz matrix ($C^H C + \sigma^2 I$) and the perturbation matrix (E) is a Toeplitz matrix (T);
   solving for the inversion (X) of the nearly Toeplitz matrix ($C^H C + \sigma^2 I$) by solving the equation:

$$X = T^{-1}(B + EX),$$

where B is a vector or matrix of dimension n by m, said solving step including the steps of:
   selecting an initial estimate $X^{(0)}$;
   iteratively computing estimates of the inversion X through the recursion:

$$X^{(n+1)} = T^{-1}(B + EX^{(n)});$$

and computing said minimum mean squared error prefilter coefficients to equalize the received signal using X.

6. The method of claim 5, wherein the matrix $\epsilon$ is given by:

$$\varepsilon \equiv \begin{bmatrix} 0 & c[L-1] & \Lambda & c[1] \\ M & M & \Lambda & M \\ 0 & \Lambda & c[L-1] & c[L-2] \\ 0 & \Lambda & 0 & c[N-1] \end{bmatrix}.$$

7. The method of claim 5, further comprising, after each iteration of the solving step, the steps of:
   determining whether a desired level of accuracy has been achieved for the inversion (X) of the nearly Toeplitz matrix ($C^H C + \sigma^2 I$); and
   when the desired level of accuracy has not been achieved, performing another iteration of the solving step.

8. The method of claim 5, wherein the step of determining a perturbation matrix (E) includes determining the perturbation matrix (E) such that the maximum eigenvalue of $T^{-1}E$ is less than one, thereby guaranteeing that the recursion in the solving step converges.

9. In an adaptive radio receiver, a method of computing an autoregressive (AR) noise-spectrum estimation from a finite number of observed noise samples $$\{y[n]\}_{n=0}^{N-1},$$

said method comprising the steps of:
   computing a channel estimate;
   generating hypothesized received samples based on the channel estimate;
   determining residual noise samples by subtracting the hypothesized received samples from the actual received samples;
   estimating AR coefficients that most accurately fit the spectrum of $$\{y[n]\}_{n=0}^{N-1},$$

wherein a vector of the AR coefficients, denoted by $a = (a_1, a_2, \ldots, a_M)$, is computed by:

$$a = \left(\sum_{n=M}^{N-1} y[n] y[n-1]^H\right) \underbrace{\left(\sum_{n=M}^{N-1} y[n-1] y[n-1]^H\right)^{-1}}_{M^{-1}},$$

where $y[n] \equiv (y[n], y[n-1], \ldots, y[n-M+1])^T$, and M is a nearly Toeplitz n by n matrix, wherein the nearly Toeplitz matrix (M) is inverted by the steps of:
   determining a perturbation matrix (E) in the form of $E = \epsilon^H \epsilon$, for a certain matrix, $\epsilon$, such that the sum of the nearly Toeplitz matrix (M) and the perturbation matrix (E) is a Toeplitz matrix (T);
   solving for the inversion (X) of the nearly Toeplitz matrix (M) by solving the equation:

$$X = T^{-1}(B + EX),$$

where B is a vector or matrix of dimension n by m, said solving step including the steps of:
   selecting an initial estimate $X^{(0)}$; and
   iteratively computing estimates of the inversion X through the recursion:

$$X^{(n+1)} = T^{-1}(B + EX^{(n)}).$$

10. The method of claim 9, wherein the receiver is a multiple-antenna receiver, and the matrix (M) is an almost block Toeplitz matrix.

11. The method of claim 9, wherein the matrix $\epsilon$ is given by:

$$\varepsilon \equiv \begin{bmatrix} y[0] & 0 & \ldots & 0 \\ y[1] & y[0] & \ldots & 0 \\ \vdots & \vdots & \ldots & \vdots \\ y[M-2] & \ldots & y[0] & 0 \\ 0 & y[N-1] & \ldots & y[N-M+1] \\ \vdots & \vdots & \ldots & \vdots \\ 0 & \ldots & y[N-1] & y[N-2] \\ 0 & \ldots & 0 & y[N-1] \end{bmatrix}.$$

12. The method of claim 9, further comprising, after each iteration of the solving step, the steps of:

determining whether a desired level of accuracy has been achieved for the inversion (X) of the nearly Toeplitz matrix (M); and when the desired level of accuracy has not been achieved, performing another iteration of the solving step.

13. The method of claim 9, wherein the step of determining a perturbation matrix (E) includes determining the perturbation matrix (E) such that the maximum eigenvalue of $T^{-1}E$ is less than one, thereby guaranteeing that the recursion in the solving step converges.

14. A channel estimator in a radio receiver that computes a least-squares (LS) channel estimate, ĉ, over a sequence of known transmitted symbols $$\{s[n]\}_{k=0}^{N-1}$$

given by the equation:

$$\hat{c} = (S^H S)^{-1} S^H r$$

where $S^H S$ is a Fisher information matrix, r is a vector of received samples, and S is a truncated convolution matrix of the transmitted symbols given by:

$$S \equiv \begin{bmatrix} s[L-1] & s[L-2] & \ldots & s[0] \\ s[L] & s[L-1] & \ldots & s[1] \\ \vdots & \vdots & \ldots & \vdots \\ s[N-1] & s[N-2] & \ldots & s[N-L] \end{bmatrix},$$

wherein the information matrix $S^H S$ is a nearly Toeplitz matrix based on whitened symbols that are unknown a priori and therefore must be computed in real time, said channel estimator comprising:

means for determining a perturbation matrix (E) in the form of $E = \epsilon^H \epsilon$, for a certain matrix, $\epsilon$, which stems from truncated portions of the convolution matrix (S) such that the sum of the nearly Toeplitz information matrix ($S^H S$) and the perturbation matrix (E) is a Toeplitz matrix (T);

means for selecting an initial estimate $X^{(0)}$ of an inversion X of the nearly Toeplitz information matrix ($S^H S$);

means for iteratively computing estimates of the inversion X through the recursion $X^{(n-1)} = T^{-1}(B + EX^{(n)})$, where B is a vector or matrix of dimension n by m;

and means for computing said least-squares channel estimate, ĉ, to equalize the received signal using X.

15. The channel estimator of claim 14, wherein the means for iteratively computing estimates of the inversion X includes:

means for determining whether a desired level of accuracy has been achieved for the inversion (X) of the nearly Toeplitz information matrix ($S^H S$); and means for iteratively computing additional estimates until the desired level of accuracy has been achieved.

16. The channel estimator of claim 14, wherein the means for determining a perturbation matrix (E) includes means for determining the perturbation matrix (E) such that the maximum eigenvalue of $T^{-1}E$ is less than one, thereby guaranteeing that the recursion in the solving step converges.

* * * * *

UNITED STATES PATENT AND TRADEMARK OFFICE
CERTIFICATE OF CORRECTION

PATENT NO. : 7,388,935 B2  Page 1 of 1
APPLICATION NO. : 10/868091
DATED : June 17, 2008
INVENTOR(S) : Hui It is certified that error appears in the above-identified patent and that said Letters Patent is hereby corrected as shown below:

On the Title Page, in Field (73), under "Assignee", in Column 1, Line 1, delete "Telefonktiebolaget" and insert -- Telefonaktiebolaget --, therefor.

In Column 9, Line 13, in Claim 5, after "receiver," insert -- minimum mean squared error (MMSE) prefilter coefficients for a decision --.

In Column 9, Lines 54-57, in Claim 6, delete "
$$\varepsilon = \begin{bmatrix} 0 & c[L-1] & \lambda & c[1] \\ M & M & \lambda & M \\ 0 & \lambda & c[L-1] & c[L-2] \\ 0 & \lambda & 0 & c[N-1] \end{bmatrix}$$
"

and insert --
$$\varepsilon = \begin{bmatrix} 0 & c[L-1] & \cdots & c[1] \\ \vdots & \vdots & \cdots & \vdots \\ 0 & \cdots & c[L-1] & c[L-2] \\ 0 & \cdots & 0 & c[N-1] \end{bmatrix}$$
--, therefor.

Signed and Sealed this

Tenth Day of March, 2009

JOHN DOLL
*Acting Director of the United States Patent and Trademark Office*